US009276299B2

(12) United States Patent
Kimura et al.

(10) Patent No.: US 9,276,299 B2
(45) Date of Patent: Mar. 1, 2016

(54) VEHICLE

(75) Inventors: Kenji Kimura, Miyoshi (JP); Tsuyoshi Hayashi, Miyoshi (JP); Kosuke Kusaba, Inazawa (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 0 days.

(21) Appl. No.: 14/374,055

(22) PCT Filed: Jan. 30, 2012

(86) PCT No.: PCT/JP2012/000570
§ 371 (c)(1),
(2), (4) Date: Jul. 23, 2014

(87) PCT Pub. No.: WO2013/114426
PCT Pub. Date: Aug. 8, 2013

(65) Prior Publication Data
US 2015/0068826 A1 Mar. 12, 2015

(51) Int. Cl.
*H01M 10/50* (2006.01)
*H01M 10/625* (2014.01)
(Continued)

(52) U.S. Cl.
CPC .............. *H01M 10/625* (2015.04); *B60K 1/04* (2013.01); *B60L 3/0007* (2013.01); *B60L 11/1864* (2013.01); *B60L 11/1874* (2013.01); *B60L 11/1877* (2013.01); *B60L 11/1879* (2013.01); *H01M 2/0237* (2013.01); *H01M 2/1077* (2013.01); *H01M 2/1083* (2013.01); *H01M 10/503* (2013.01); *H01M 10/5016* (2013.01); *H01M 10/5046* (2013.01); *H01M 10/613* (2015.04); *H01M 10/643* (2015.04); *H01M 10/6551* (2015.04); *H01M 10/6554* (2015.04);

(Continued)

(58) Field of Classification Search
CPC .......... H01M 10/503; H01M 10/5046; H01M 2220/20; H01M 10/5016; H01M 10/625; B60K 1/04; B60K 2001/0416; B60L 11/1877; B60L 11/1879
See application file for complete search history.

(56) References Cited

U.S. PATENT DOCUMENTS 1,766,026 A * 6/1930 Klock ............................ 429/120
4,585,712 A * 4/1986 Wedlake ......................... 429/50
(Continued)

FOREIGN PATENT DOCUMENTS

JP          10-016689 A      1/1998
JP       2001-256949 A      9/2001
(Continued)

OTHER PUBLICATIONS

International Search Report of PCT/JP2012/000570 dated Apr. 24, 2012 [PCT/ISA/210].

*Primary Examiner* — John Walters
*Assistant Examiner* — Brian Swenson
(74) *Attorney, Agent, or Firm* — Sughrue Mion, PLLC

(57) ABSTRACT

A vehicle having a battery mounted thereon is provided. The battery includes a cell group having a plurality of cells, each of the cells including an electrolytic solution and a power-generating element within a case of cylindrical shape, and a holding member holding each of the cells in a diameter direction of the cell, wherein the cell group is placed in an area inside an edge of the holding member when viewed from a height direction of the vehicle. Each of the cells can be arranged to extend in the height direction of the vehicle. The holding member may be a heat dissipation plate allowing heat exchange between the cells.

5 Claims, 4 Drawing Sheets

(51) Int. Cl.
*H01M 2/10* (2006.01)
*B60L 11/18* (2006.01)
*B60L 3/00* (2006.01)
*H01M 2/02* (2006.01)
*H01M 10/643* (2014.01)
*B60K 1/04* (2006.01)
*H01M 10/6551* (2014.01)
*H01M 10/6555* (2014.01)
*H01M 10/6554* (2014.01)
*H01M 10/613* (2014.01)

(52) U.S. Cl.
CPC ... *H01M 10/6555* (2015.04); *B60K 2001/0416* (2013.01); *B60L 2240/545* (2013.01); *H01M 2220/20* (2013.01); *Y02T 10/7005* (2013.01); *Y02T 10/7061* (2013.01)

(56) References Cited

U.S. PATENT DOCUMENTS

| | | | |
|---|---|---|---|
| 5,034,290 A * | 7/1991 | Sands et al. | 429/120 |
| 6,225,788 B1 | 5/2001 | Kouzu et al. | |
| 6,344,728 B1 | 2/2002 | Kouzu et al. | |
| 6,410,185 B1 * | 6/2002 | Takahashi et al. | 429/163 |
| 6,411,063 B1 | 6/2002 | Kouzu et al. | |
| 6,537,694 B1 * | 3/2003 | Sugiura et al. | 429/120 |
| 8,609,268 B2 * | 12/2013 | Fuhr et al. | 429/87 |
| 2009/0145676 A1 * | 6/2009 | Takasaki et al. | 180/65.1 |
| 2010/0129703 A1 * | 5/2010 | Caumont et al. | 429/120 |
| 2010/0279159 A1 * | 11/2010 | Meintschel et al. | 429/94 |
| 2011/0159340 A1 * | 6/2011 | Hu et al. | 429/120 |
| 2012/0003522 A1 * | 1/2012 | Fuhr et al. | 429/120 |
| 2012/0082887 A1 * | 4/2012 | Ninomiya et al. | 429/159 |

FOREIGN PATENT DOCUMENTS

| | | |
|---|---|---|
| JP | 2004-071168 A | 3/2004 |
| JP | 2007-050803 A | 3/2007 |
| JP | 4117650 B2 | 7/2008 |
| JP | 2009-137408 A | 6/2009 |
| JP | 2010-272430 A | 12/2010 |
| JP | 2012209203 A | 10/2012 |

* cited by examiner

VEHICLE

CROSS REFERENCE TO RELATED APPLICATIONS

This is a National Stage of International Application No. PCT/JP2012/000570 filed Jan. 30, 2012, the content of all of which is incorporated herein by reference in its entirety.

TECHNICAL FIELD

The present invention relates to a vehicle having a battery mounted thereon, and more particularly, to a technique for protecting the battery from a collision of the vehicle.

BACKGROUND ART

An electrically powered vehicle such as an electric vehicle and a hybrid vehicle has a motor mounted thereon for running the vehicle, and the motor is driven with electric power supplied from a battery. Patent Document 1 has disclosed a vehicle on which a battery including a plurality of cylindrical cells is mounted. The cells are oriented such that the axial direction thereof matches a vehicle width direction.

PRIOR ART DOCUMENT

Patent Document

[Patent Document 1] Japanese Patent Laid-Open No. 2007-050803 (see, for example FIG. 4)

DISCLOSURE OF THE INVENTION

Problems to be Solved by the Invention

The configuration mentioned above, however, requires a reinforcement member for protecting the battery upon a collision of the vehicle, resulting in an increased number of components.

It is thus an object of the present invention to protect a battery from a collision of a vehicle while an increase in number of components is suppressed.

Means for Solving the Problems

To solve the problem, the present invention provides (1) a vehicle having a battery mounted thereon, the battery including a cell group having a plurality of cells, each of the cells including an electrolytic solution and a power-generating element within a case of cylindrical shape, and a holding member holding each of the cells in a diameter direction of the cell, wherein the cell group is placed in an area inside an edge of the holding member when viewed from a height direction of the vehicle.

(2) In the configuration of (1), each of the cells can be oriented such that an axial direction orthogonal to the diameter direction matches the height direction of the vehicle.

(3) In the configuration of (2), the holding member may be a heat dissipation plate allowing heat exchange between the cells. According to the configuration of (3), variations in temperature between the cells can be reduced.

(4) In the configuration of (3), the heat dissipation plate can be formed to have a first edge portion extending in a vehicle width direction and a second edge portion extending in a forward/rearward direction of the vehicle orthogonal to the vehicle width direction when viewed from the height direction of the vehicle.

(5) In the configuration of (3), a positive electrode of the cell is located at a higher level and a negative electrode of the cell is located at a lower level in the height direction of the vehicle. According to the configuration of (5), the electrolytic solution can be prevented from escaping to the outside of the case. This can suppress a reduction in life of the cells.

(6) In the configuration of (3), the vehicle can includes a battery case housing the battery, and the heat dissipation plate can be fixed to the battery case in contact with each other. According to the configuration of (6), the heat in the cell group is dissipated to the battery case through the heat dissipation plate. This suppresses a temperature rise in the cell group more effectively.

(7) The battery described in (3) can be mounted in a luggage room of the vehicle.

Advantage of the Invention

According to the present invention, the battery can be protected from a collision of the vehicle while an increase in number of components is suppressed.

MODE FOR CARRYING OUT THE INVENTION

Figure 1:
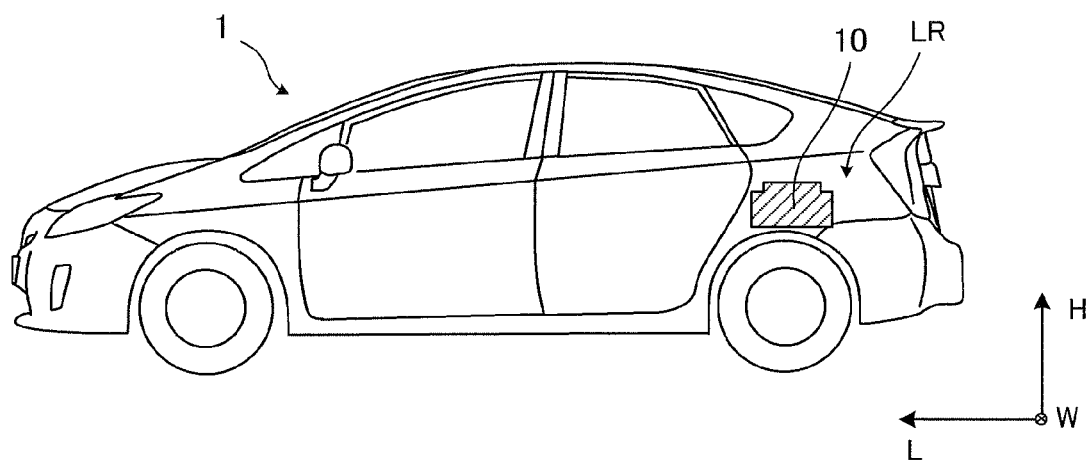
FIG. 1 is an external view of a vehicle when viewed from a car width direction.
Figure 2:
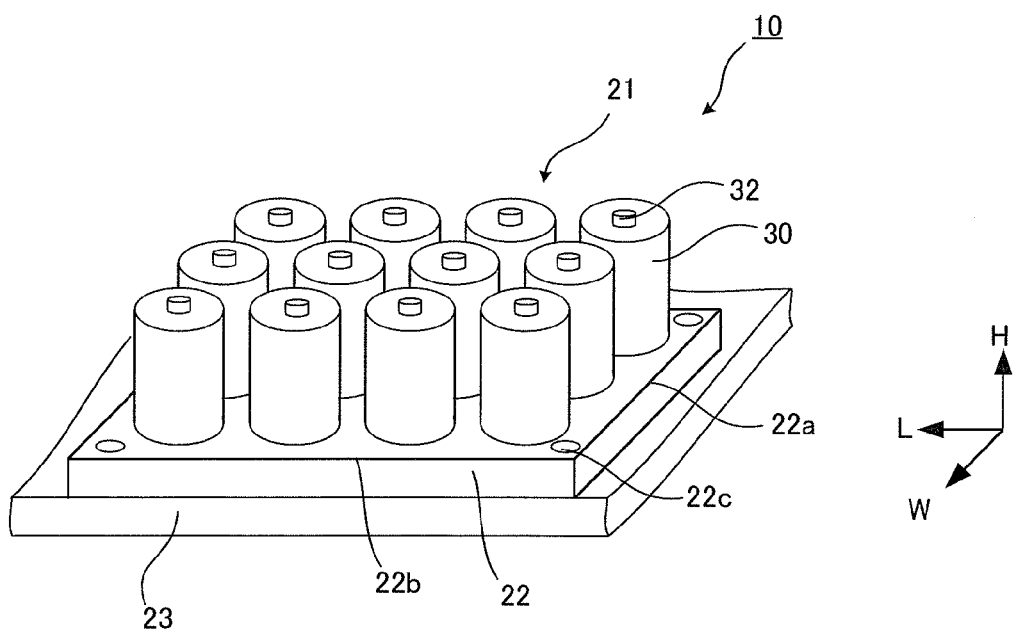
FIG. 2 is a perspective view of a battery.
Figure 3:
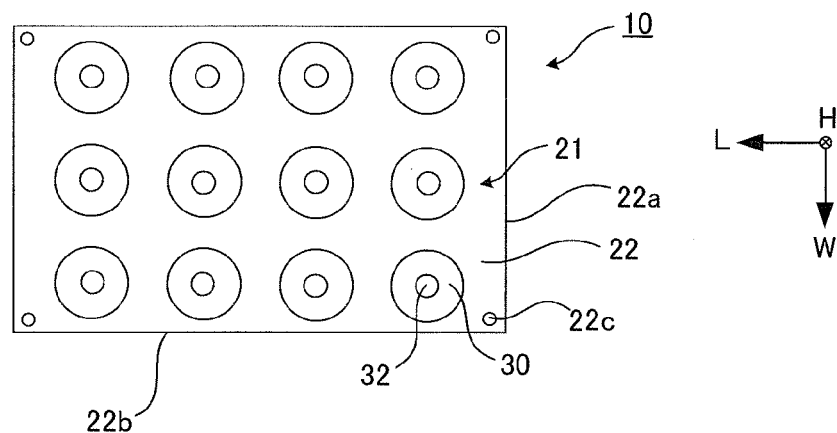
FIG. 3 is a plan view of the battery.

FIG. 1 is an external view of a vehicle when viewed from a vehicle width direction, in which a battery is hatched transparently. FIG. 2 is a perspective view of the battery and shows only part of a battery case. FIG. 3 is a schematic plan view of the vehicle, in which the battery case is omitted. In those figures, H represents a height direction of the vehicle, W represents the vehicle width direction, and L represents a forward direction of the vehicle orthogonal to the vehicle width direction W. The vehicle 1 may be a hybrid vehicle or an electric vehicle having a powering means for driving a vehicle-running motor by using the output from a battery 10. However, the battery 10 may be an auxiliary battery which supplies a working power to an auxiliary load mounted on the vehicle 1. In this case, the vehicle 1 may be a vehicle other than the hybrid vehicle and the electric vehicle (for example, a vehicle having only an internal-combustion engine as the powering means).

The battery 10 can be placed in a luggage room LR. The luggage room LR refers to a baggage room formed at the back of a rear seat in the vehicle 1. When a shock is given to the vehicle 1 in the vehicle width direction W, the vehicle forward direction L, or a vehicle rearward direction (the vehicle forward direction L and the vehicle rearward direction may also be referred to as a vehicle forward/rearward direction collectively), a deformed vehicle frame or the like may abut on and apply a load to the battery 10. The battery 10 is protected from the collision by including the following configuration.

Figure 4:
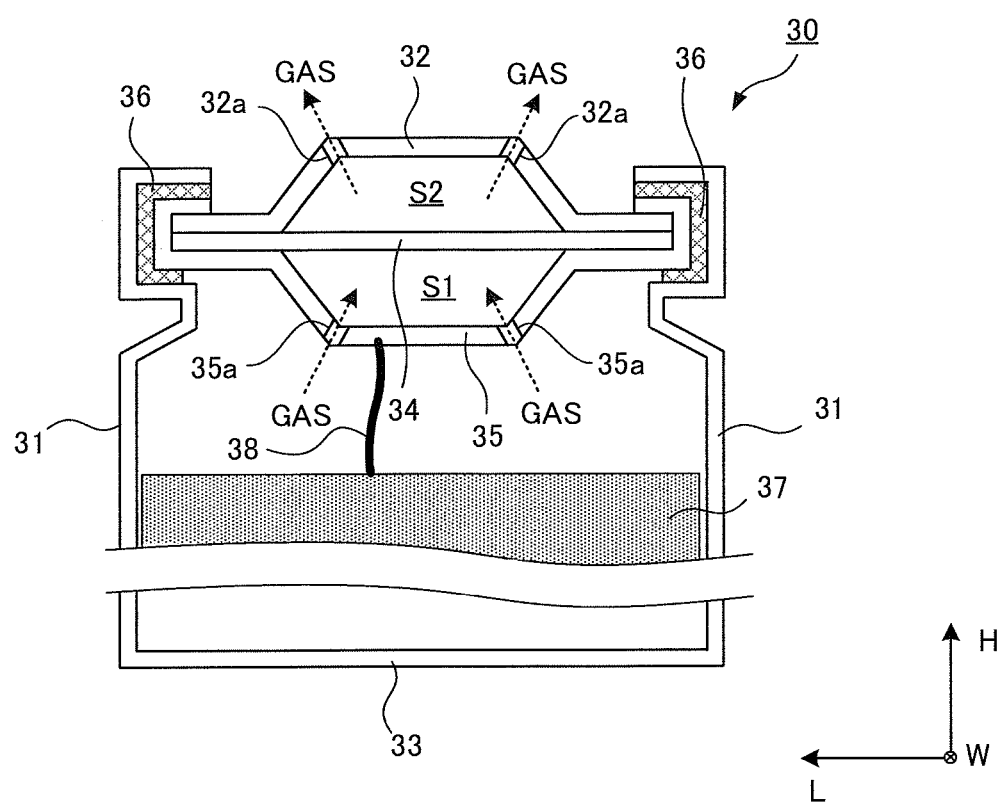
FIG. 4 is a section view of part of a cell.

Referring to FIG. 2 and FIG. 3, the battery 10 includes a cell group 21 and a holding plate 22 (corresponding to a holding member) for holding the cell group 21. The cell group 21 includes a plurality of cells 30. FIG. 4 is a section view of part of the cell and shows only a positive electrode, a negative electrode, and their surroundings. Referring to FIG. 4, the cell 30 includes a case 31, a positive electrode terminal 32, a negative electrode terminal 33, a power-generating element 37, and an electrolytic solution. The case 31 is formed in a cylindrical shape. The power-generating element 37 includes a positive electrode element of sheet form, a negative electrode element of sheet form, and a separator disposed between the positive electrode element and the negative electrode element, all of which are wound around an axial direction of the cell 30, and the winding is housed in the case 31.

The electrolytic solution is contained in the case 31 such that a portion thereof is impregnated into the separator and the remainder stays at the bottom of the case 31. The electrolytic solution staying at the bottom of the case 31 is referred to as a free electrolytic solution.

The positive electrode terminal 32 is formed in a shape protruding toward the height direction H of the vehicle, and its outer edge portion is in contact with a valve disc 34 in the height direction H of the vehicle. The valve disc 34 is formed in a flat plate shape.

A seal plate 35 is formed in a shape protruding toward the direction opposite to the height direction H of the vehicle, and its outer edge portion surrounds and holds the outer edge of the positive electrode terminal 32 and an outer edge of the valve disc 34. The seal plate 35 is disposed at a position to cover an opening portion of the case 31, and a gasket is disposed between the seal plate 35 and the case 31. This hermetically seals the cell 30.

The seal plate 35 has a gas passage 35a shaped to pass therethrough, and the positive electrode terminal 32 has a discharge port 32a shaped to pass therethrough. The seal plate 35 and the power-generating element 37 are connected to each other through a lead 38. An electric power generated in the power-generating element 37 is taken out of the cell 30 through the lead 38, the seal plate 35, and the positive electrode terminal 32.

Gas is produced from the power-generating element 37, passes through the gas passage 35a, and enters a space S1 formed between the seal plate 35 and the valve disc 34. When the internal pressure of the cell 30 reaches the operating pressure of the valve disc 34, the valve disc 34 is broken to allow the gas to move into a space S2 formed between the positive electrode terminal 32 and the valve disc 34. After the gas moves into the space S2, the gas passes through the discharge port 32a formed in the positive electrode terminal 32 and is let out of the cell 30.

Each of the cells 30 is oriented such that its axial direction, that is, a direction orthogonal to a diameter direction of the case 31, matches the height direction H of the vehicle. In the height direction H of the vehicle, the positive electrode terminal 32 is located above the negative electrode terminal 33. The negative electrode terminal 33 and the case 31 have an equal potential. Thus, the free electrolyte solution stays at the bottom of the case 31, that is, closer to the negative electrode terminal 33 rather than the positive electrode terminal 32. In a comparative example in which the cell group 21 is arranged such that the axial direction of the cell 30 matches horizontal direction such as the vehicle width direction W, part of the free electrolytic solution contacts the gasket 36. As a result, part of the free electrolytic solution may escape through the gasket 36 to the outside of the case 31 to shorten the life of the cell 30. In contrast, in the present embodiment, the free electrolytic solution can stay at the bottom of the case 31 separate from the gasket 36 to prevent the escape of the free electrolytic solution to the outside of the case 31.

Referring again to FIG. 2 and FIG. 3, the holding plate 22 holds the cells 30 in the diameter direction of the case 31. An insulating layer, not shown, may be provided in a gap between the holding plate 22 and the cell 30. The holding plate 22 has a first edge portion 22a extending in the vehicle width direction W and a second edge portion 22b extending in the vehicle forward direction L when viewed from the height direction H of the vehicle. The holding plate 22 is made of metal and has a heat dissipation function of conducting the heat of the cell 30 at a higher temperature to the cell 30 at a lower temperature. This reduces variations in temperature between the cells 30. Since the cell 30 is deteriorated at a higher rate with an increase in temperature, the reduced variations in temperature effectively reduces variations in life between the cells 30.

The holding plate 22 may be provided by using metal. The holding plate 22 made of metal can enhance the heat dissipation effect. Examples of the metal may include aluminum, copper, and iron. Since aluminum has the advantages of a high thermal conductivity, a light weight, and a low cost. Thus, the holding plate 22 made of aluminum can reduce the variations in temperature between the cells 30 more effectively, and reduce the weight and the cost of the battery 10.

The cells 30 can be connected in parallel through a bus bar, not shown. The parallel connection tends to increase the difference in temperature between the cells 30 as compared with series connection. The reasons are as follows: The cell 30 has an internal resistance which decreases as the temperature rises. In the parallel connection, the cell 30 at a higher temperature has a current value higher than that of the cell 30 at a lower temperature. The temperature of heat generated in the cell 30 is calculated by multiplying the internal resistance by the square of the current value. Thus, the temperature difference between the cell 30 at a higher temperature and the cell 30 at a lower temperature increases every moment. According to the configuration of the present embodiment, the heat dissipation effect of the holding plate 22 suppresses the increase in the temperature difference between the cells 30, so that the disadvantage described above can be reduced. The parallel connection of the cells 30 increases the capacity of the battery 10.

The battery 10 may be connected in series to a plurality of similar batteries 10 to constitute an assembled battery. This increases the output.

As shown in FIG. 2, the holding plate 22 is fixed to a battery case 23. FIG. 2 shows the configuration in part of the battery case 23. The holding plate 22 has, at its four corners, fastening hole portions 22c for securing fastening members, not shown. The fastening members are secured at the fastening hole portions 22c to fix the holding plate 22 to the battery case 23 in contact with each other. The battery case 23 can be provided by using metal. With such a configuration, the heat conducted from the cell group 21 to the holding plate 22 can be released to the battery case 23. This further enhances the cooling function of cooling the cells 30.

A shock may be given to the vehicle 1 in the vehicle width direction W or the vehicle forward/rearward direction to deform a frame or the like of the vehicle (hereinafter referred to as a vehicle structure) in the direction in which the battery 10 collides. Since the cell group 21 is placed inside the edge of the holding plate 22 when viewed from the height direction of the vehicle, that is, inside the first edge portion 22a and the second edge portion 22b, the deformed vehicle structure abuts on the first edge portion 22a and the second edge portion 22b of the holding plate 22 instead of the cell group 21. The holding plate 22 is elastically or plastically deformed to absorb the shock. This protects the cell group 21 from the shock. In this manner, the holding plate 22 has the function of reducing the variations in temperature between the cells 30, the function of holding the cell group 21, and the function of protecting the cell group 21 from the vehicle collision. The integration of the functions can simplify the structure and reduce the cost. In other words, an independent auxiliary member or the like for protecting the cell group 21 can be omitted.

Modification 1

Figure 5:
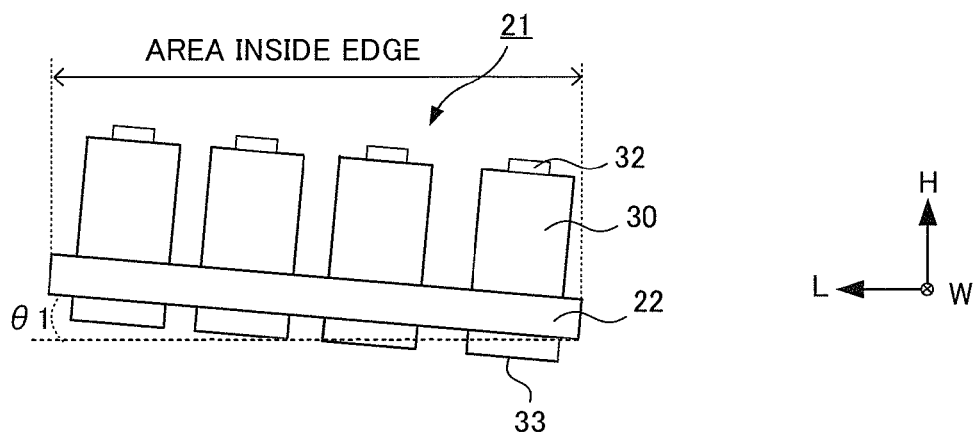
FIG. 5 is a section view of a battery in Modification 1.

Although the embodiment includes the cells 30 arranged to extend in the height direction H of the vehicle, the present invention is not limited thereto. It is only required that the cell group 21 should be placed in an area inside the edge of the holding plate 22, that is, such that the cell group 21 should be placed not to extend outside the edge of the holding plate 22, when viewed from the height direction H of the vehicle. For example, as shown in FIG. 5, the holding plate 22 and the cell group 21 can be inclined at an angle θ1 with respect to the vehicle forward direction L as long as the cell group 21 is placed in an area inside the edge of the holding plate 22 when viewed from the height direction H of the vehicle.

Modification 2

Figure 6:
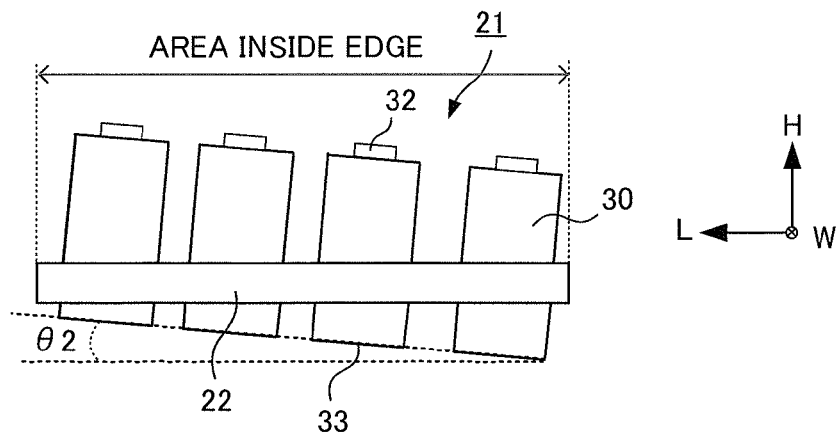
FIG. 6 is a section view of a battery in Modification 2.

As shown in FIG. 6, only the group of the batteries 21, out of the cell group 21 and the holding plate 22, can be inclined at an angle θ2 with respect to the vehicle forward direction L as long as the cell group 21 is placed in an area inside the edge of the holding plate 22 when viewed from the height direction H of the vehicle. According to the configurations shown in Modifications 1 and 2, the vehicle structure is deformed toward the battery 10 in the vehicle width direction W or the vehicle forward/rearward direction upon a collision of the vehicle and abuts on the holding plate 22, so that the cell group 21 can be protected from the shock.

Modification 3

Although the embodiment described above includes the battery 10 disposed in the luggage room LR, the present invention is not limited thereto, and the battery 10 may be placed at a different position. The different position may be on a floor panel below the rear seat. In this case, the holding plate 22 serves as a protecting wall against a shock given in the vehicle forward/rearward direction L and the vehicle width direction W to protect the cell group 21. Thus, the cell group 21 is also protected from the collision when the battery 10 is placed below the rear seat.

Modification 4

The embodiment described above includes the holding plate 22 formed in the rectangular shape, the present invention is not limited thereto, and a different configuration may be used. The different configuration may be a circular shape, an oval shape, or a polygonal shape other than the rectangular shape. When those shapes are used, the cell group 21 can be disposed inside the edge of the holding plate 22 when viewed from the height direction of the vehicle to protect the cell group 21 from the shock upon a collision of the vehicle.

Modification 5

The embodiment described above includes the holding plate 22 fixed to the battery case 23 by the fastening members, the present invention is not limited thereto, and a different fixing method may be used. Examples of the different fixing method may include welding and swaging. With the different fixing method, the holding plate 22 and the battery case 23 can be brought into contact with each other to dissipate the heat of the cell group 21 to the battery case 23 through the holding plate 22.

Modification 6

The embodiment described above includes the holding plate 22 having the heat dissipation function, the present invention is not limited thereto, and a plate member having an extremely low thermal conductivity may be used. In this case, a heat exchange element (for example, a Pertier effect device) may be provided for each of the cells 30 to reduce the variations in temperature between the cells 30.

The invention claimed is:

1. A vehicle having a battery mounted thereon, the battery comprising:
    a cell group having a plurality of cells, each of the cells including an electrolytic solution and a power-generating element within a case of cylindrical shape; and
    a heat dissipation plate allowing heat exchange between the cells and holding each of the cells in a diameter direction of the cell,
    wherein the cell group is placed in an area inside an edge of the heat dissipation plate when viewed from a height direction of the vehicle,
    the plurality of cells pass through the heat dissipation plate, respectively, and
    a plurality of positive electrodes of the plurality of cells are located above the heat dissipation plate and a plurality of negative electrodes of the plurality of cells are located at a lower level in the height direction of the vehicle.

2. The vehicle according to claim 1, wherein each of the cells is oriented such that an axial direction orthogonal to the diameter direction matches the height direction of the vehicle.

3. The vehicle according to claim 1, wherein the heat dissipation plate has a first edge portion extending in a vehicle width direction and a second edge portion extending in a forward/rearward direction of the vehicle orthogonal to the vehicle width direction when viewed from the height direction of the vehicle.

4. The vehicle according to claim 1, further comprising a battery case housing the battery,
    wherein the heat dissipation plate is fixed to the battery case in contact with each other.

5. The vehicle according to claim 1, wherein the battery is mounted in a luggage room of the vehicle.

* * * * *